(12) United States Patent
Lin

(10) Patent No.: US 10,534,444 B2
(45) Date of Patent: Jan. 14, 2020

(54) FLEXIBLE DEVICE

(71) Applicant: SHENZHEN ROYOLE TECHNOLOGIES CO., LTD., Guangdong (CN)

(72) Inventor: Qi Lin, Guangdong (CN)

(73) Assignee: SHENZHEN ROYOLE TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/080,013

(22) PCT Filed: Jul. 6, 2016

(86) PCT No.: PCT/CN2016/088907
§ 371 (c)(1),
(2) Date: Aug. 26, 2018

(87) PCT Pub. No.: WO2018/006303
PCT Pub. Date: Jan. 11, 2018

(65) Prior Publication Data
US 2019/0087016 A1 Mar. 21, 2019

(51) Int. Cl.
*G06F 3/02* (2006.01)
*G06F 3/041* (2006.01)
(Continued)

(52) U.S. Cl.
CPC .......... *G06F 3/0221* (2013.01); *G06F 1/1601* (2013.01); *G06F 3/041* (2013.01); *H04R 1/028* (2013.01); *H04R 5/023* (2013.01); *G06F 2203/04102* (2013.01); *H04R 2201/028* (2013.01)

(58) Field of Classification Search
CPC .. H05K 5/0247; H05K 9/0024; H05K 5/0008; H05K 9/0067; H05K 5/04; H05K 5/0052; H05K 5/0017; H05K 5/006; H05K 1/111; H05K 2201/093; H05K 2201/10371; H05K 2201/10409
See application file for complete search history.

(56) References Cited

U.S. PATENT DOCUMENTS 9,286,812 B2 * 3/2016 Bohn ...................... G09F 9/301
9,787,076 B2 * 10/2017 Li ........................ H05K 7/1491
(Continued)

FOREIGN PATENT DOCUMENTS

CN 201655172 U 11/2010
CN 201754266 U 3/2011
(Continued)

OTHER PUBLICATIONS

International Search Report for PCT/CN2016/088907 dated Mar. 1, 2017.

*Primary Examiner* — Xanthia C Cunningham
(74) *Attorney, Agent, or Firm* — IPro, PLLC; Na Xu

(57) ABSTRACT

A flexible device, comprising a housing (10) and a flexible element (20), and further comprising a driving element (30) received in the housing (10). The driving element (30) may drive the flexible element (20) to be received in the housing (10) when working. By enabling the housing (10) to receive the driving element (30), the length of the flexible device can be effectively reduced, so that the flexible device is easy to carry.

20 Claims, 3 Drawing Sheets

(51) Int. Cl.
  *G06F 1/16* (2006.01)
  *H04R 5/02* (2006.01)
  *H04R 1/02* (2006.01)

(56) References Cited

U.S. PATENT DOCUMENTS

| | | | | |
|---|---|---|---|---|
| 9,817,443 B2* | 11/2017 | Kim | | G06F 1/1652 |
| 9,864,412 B2* | 1/2018 | Park | | G06F 1/1656 |
| 10,082,826 B1* | 9/2018 | Salmon | | G09F 9/301 |
| 10,152,086 B2* | 12/2018 | Choi | | G06F 1/1616 |
| 10,209,742 B2* | 2/2019 | Shin | | G06F 1/1624 |
| 2003/0025668 A1 | 2/2003 | Lin | | |
| 2006/0176243 A1* | 8/2006 | Yeh | | G06F 1/1624 |
| | | | | 345/30 |
| 2008/0144265 A1* | 6/2008 | Aoki | | G06F 1/1601 |
| | | | | 361/679.04 |
| 2009/0231307 A1* | 9/2009 | Lee | | G06F 1/1601 |
| | | | | 345/184 |
| 2012/0204453 A1* | 8/2012 | Jung | | G09F 9/301 |
| | | | | 40/517 |
| 2012/0212433 A1* | 8/2012 | Lee | | G06F 1/1652 |
| | | | | 345/173 |
| 2013/0058063 A1* | 3/2013 | O'Brien | | G06F 1/1624 |
| | | | | 361/807 |
| 2013/0128439 A1* | 5/2013 | Walters | | G06F 1/1641 |
| | | | | 361/679.04 |
| 2013/0314762 A1* | 11/2013 | Kwack | | G02F 1/09 |
| | | | | 359/280 |
| 2013/0331154 A1* | 12/2013 | Huang | | H04M 1/0235 |
| | | | | 455/575.4 |
| 2014/0194165 A1* | 7/2014 | Hwang | | G06F 1/1677 |
| | | | | 455/566 |
| 2014/0218375 A1* | 8/2014 | Kim | | G06F 3/147 |
| | | | | 345/501 |
| 2016/0100478 A1* | 4/2016 | Lee | | H04M 1/0202 |
| | | | | 361/749 |
| 2016/0135284 A1* | 5/2016 | Choi | | G09F 9/301 |
| | | | | 361/749 |
| 2016/0163242 A1* | 6/2016 | Lee | | G09F 9/301 |
| | | | | 40/584 |
| 2016/0320804 A1* | 11/2016 | Takayanagi | | G06F 1/1615 |

FOREIGN PATENT DOCUMENTS

| | | | | |
|---|---|---|---|---|
| CN | 102522049 A | | 6/2012 | |
| KR | 20170014906 A | * | 2/2017 | ........... G06F 1/1652 |

* cited by examiner

FLEXIBLE DEVICE

CROSS-REFERENCE TO RELATED APPLICATIONS

This application is a US national phase application of International Application No. PCT/CN2016/088907, filed Jul. 6, 2016, the entire contents of which are incorporated herein by reference.

FIELD

The present disclosure relates to a field of flexible devices, and more particularly to a flexible keyboard.

BACKGROUND

The keyboard has been widely used as a general peripheral device for computers. The existing keyboard is usually made of a hard plastic material, and can only be placed in a position providing a fixed dimension and thus is not convenient to be carried with. Currently, a flexible keyboard capable of rolling up is provided in the related art, and it can spread out when it is used, otherwise it may be rolled up for storage.

A flexible touchpad is usually used as a flexible element in the flexible keyboard, and the user can touch letters or characters on the flexible touchpad for input. The existing flexible keyboard usually includes a housing, a flexible touchpad and a motor for driving the flexible touchpad to rotate, and thus the flexible touchpad is curled in the housing. The motor is generally accommodated in a motor cavity outside the housing and adjacent to an end of the housing. Due to the fact that the motor cavity is placed outside the housing, the total length of the flexible keyboard is increased, thus affecting the portability of the flexible keyboard.

SUMMARY

Accordingly, embodiments of the present disclosure provide a flexible device which may be convenient to carry.

In embodiments of the present disclosure, a flexible device includes: a housing, a flexible element, and a driving element accommodated in the housing, wherein the driving element is operated to drive the flexible element to be accommodated in the housing.

With the driving element being accommodated in the housing, the motor cavity outside the housing may be omitted, thus reducing the total length of the flexible device and being portable.

BRIEF DESCRIPTION OF THE DRAWINGS

Drawings which are involved in the description of embodiments will be introduced below in brief for illustrating technical solutions in embodiments of the present disclosure, it will be appreciated that drawings described below are merely some implementations of the present disclosure, and other modifications can also be obtained by those who skilled in the art, without creative work.

DETAILED DESCRIPTION

In order to make purposes, technical solutions and advantages of embodiments of the present disclosure more clear, reference will be made in detail to embodiments of the present disclosure with accompanying drawings.

Figure 1:
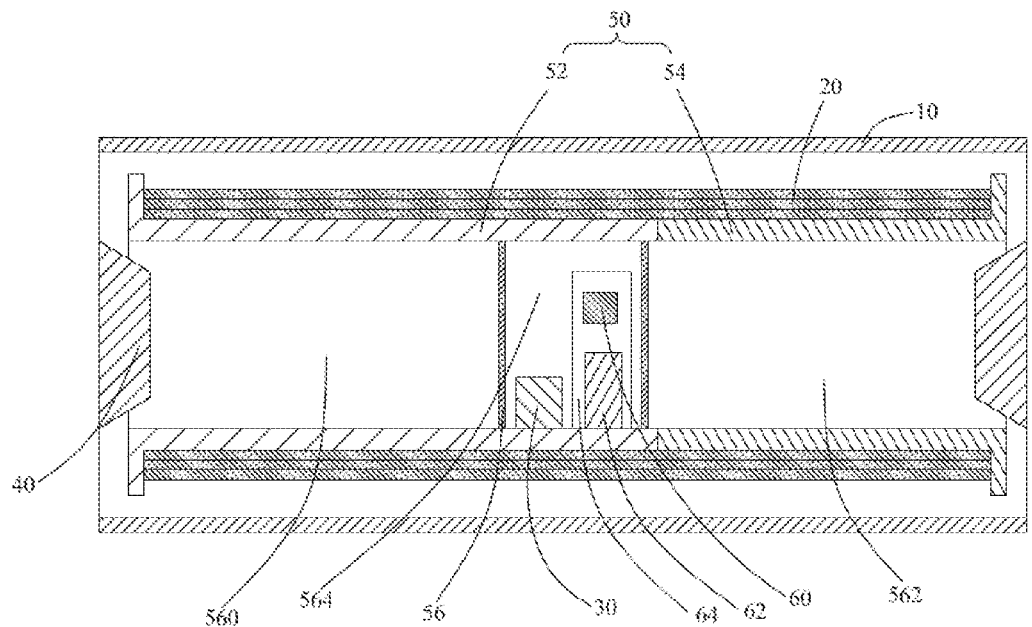
FIG. 1 is a schematic diagram of a flexible device according to an embodiment of the present disclosure.

With reference to FIG. 1, a flexible device is provided according to an embodiment of the present disclosure. The flexible device includes a housing 10, a flexible element 20, and a driving element 30 accommodated in the housing 10. The driving element 30 drives the flexible element 20 to be rolled up in the housing 10. With the driving element 30 being accommodated in the housing 10, an additional cavity outside the housing 10 is no longer needed, thus effectively reducing a total length of the flexible device.

The housing 10 is made of a hard material such as metal, plastic or the like to protect components therein. The housing 10 has a cylindrical shape, and an opening is provided at each of two ends of the housing 10 opposite to each other, and two speakers 40 may be accommodated in the housing through the openings. Sound production directions of two speakers 40 are from the ends of the flexible device to the outside and opposite to each other. The housing 10 defines a cavity for accommodating the flexible element 20 and the driving element 30. A slot is provided in a side of the housing, such that he flexible element 20 can be spread out from the housing 10 or rolled up in the housing 10. The slot and the openings are communicated with the cavity.

Figure 2:
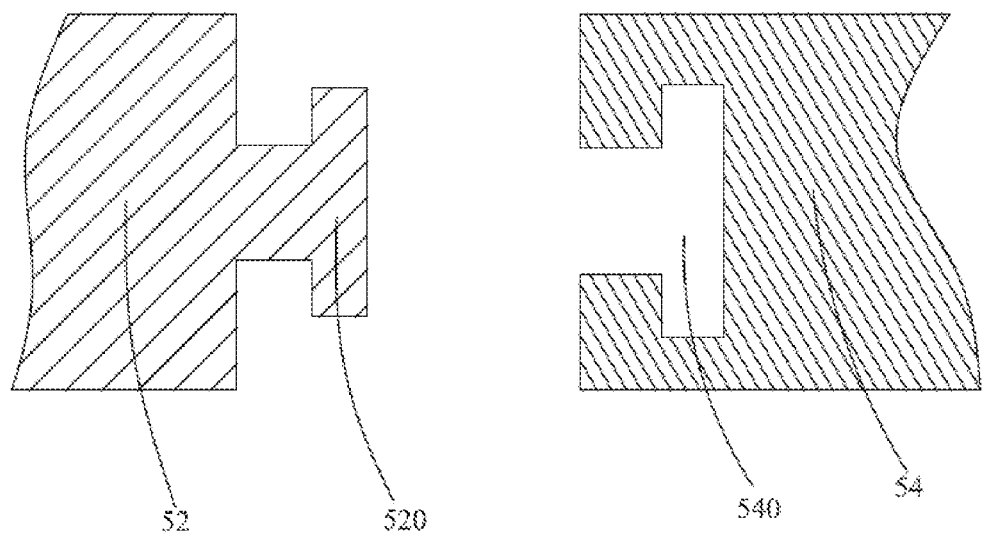
FIG. 2 is a schematic diagram showing housing assembly of the flexible device of FIG. 1.

An inner casing 50 is further provided in the cavity of the housing 10. The outer diameter of the inner casing 50 is smaller than the inner diameter of the housing 10. The inner casing 50 is disposed coaxially with the housing 10. The driving element 30 is accommodated in the inner casing 50. The inner casing 50 includes a fixed member 52 and a movable member 54 that is movable relative to the fixed member 52. The fixed member 52 is at an end of the inner casing 50, and the movable member 54 is at the opposite end of the inner casing 50. In an embodiment, the fixed member 52 is at the left end of the inner casing 50, and the movable member 54 is at the right end of the inner casing 50. Alternatively, it is possible to switch the positions of fixed member 52 and the movable member 54 according to actual needs. The fixed member 52 is fixed with respect to the housing 10, and the movable member 54 is movable with respect to the housing 10. The fixed member 52 is fixed in the housing 10, and the movable member 54 is movably mounted to an end of the fixed member 52, and thus the movable member 54 may also move with respect to the fixed member 52. An end of the fixed member 52 is movably connected with an end of the movable member 54. With reference to FIG. 2, the movable connection between the fixed member 52 and the movable member 54 can be achieved through a cooperation of an annular protrusion 520 and an annular groove 540. For example, the annular protrusion 520 may be extended from the right end of the fixed member 52 and the annular groove 54 may be formed at the left end of the movable member 54, and the protrusion 520 is engaged in the groove 540 so as to realize the movable connection. A diameter of the right end of the protrusion 520 is greater than a diameter of the left end of the protrusion 520 to prevent the protrusion 520 from sliding out of the groove 540. Alternatively, the movable connection between the fixed member 52 and the movable member 54 may also be implemented in other ways. In another embodiment, a groove 540 is formed in the fixed member 52 and the protrusion 520 is formed from the movable member 54. In a further embodiment, snap joints are formed on the fixed member 52 and the movable member 54. Both the fixed member 52 and the movable member 54 have a hollow cylindrical shape, and they are coaxially arranged. Outer surfaces of the fixed member 52 and the movable member 54 are aligned to each other. The fixed member 52 and the movable member 54 together define a cylindrical inner cavity. Both ends of the inner cavity are communicated with the openings.

The driving element 30 is fixed to the fixed member 52. Since the fixed member 52 is a hollow cylinder, the driving element 30 is fixed on the inner surface of the fixed member 52 and the fixed member 52 surrounds the driving element 30. In an embodiment, the driving element 30 includes a motor. The driving element 30 is connected to the movable member 54 by a connecting rod so that the movable member 54 can be driven to rotate. In an embodiment, the driving element 30 is connected to the inner surface of the movable member 54 through a connecting rod.

The flexible device also includes a controller 60 for controlling the driving element 30 and the flexible element 20 and a battery 62 for supplying power. Both the controller 60 and the battery 62 are fixed to the fixed member 52. In an embodiment, the controller 60 and the battery 62 can be integrated on a circuit board 64. The circuit board 64 is then fixed on the inner surface of the fixed member 52 via screws, snaps, or the like.

A partition is formed from the inner surface of the fixed member 52 in the inner casing and divides the inner cavity into a first cavity 560 and a second cavity 562. In an embodiment, there are two partitions 56, and one partition is formed near an end of the driving element 30 and the other partition is formed near the other end of the driving element 30. The two partitions 56 and the inner surface of the fixed member 52 together define an electronic device cavity 564 for accommodating the driving element 30, the circuit board 64, the controller 60 and the battery 62. In an embodiment, the electronic device cavity 564 is defined in the middle of the inner casing 50, between the first cavity 560 and the second cavity 562 corresponding to positions of the fixed member 52 and the movable member 54 respectively. In other words, the fixed member 52 defines the first cavity 560 and the movable member 54 defines the second cavity 562. The first cavity 560 and the second cavity 562 are located behind the corresponding speakers 40 to form a rear sound cavity. The first cavity 560 and the second cavity 562 are respectively opened toward opposite ends of the housing 10. Both volumes of the first cavity 560 and the second cavity 562 are larger than the volume of the electronic device cavity 564. Since the electronic device cavity 564 is only provided in the middle of the inner cavity, the occupied space is small, such that the first cavity 560 and the second cavity 562 may have a large volume, which is favorable for the speaker 40 to produce high quality sound, especially a bass with improved quality. Moreover, with the presence of the partitions 56 of the electronic device chamber 564, the first cavity 560 and the second cavity 562 are sealed approximately and apart away from each other, thus further improving the sound quality of the speaker 40. In addition, since the speakers 40 are respectively located at opposite ends of the flexible device, they can be respectively produce sound toward two ears of a user, thus realizing improved stereo sounds and improving hearing experience of the user. In an embodiment, a total length of the flexible device may be set to be the same as or slightly larger than a distance between the two ears of a user. In an embodiment, an average distance between the two ears of a human is 145 mm, and the total length of the flexible device may be set to 150 mm. Therefore, when the two speakers 40 produce sound outwardly, auditory sense of the user is basically the same as the case that a speaker is disposed in the middle of the flexible device and produce sound directly toward the user, thus ensuring hearing experience of the user.

Figure 3:
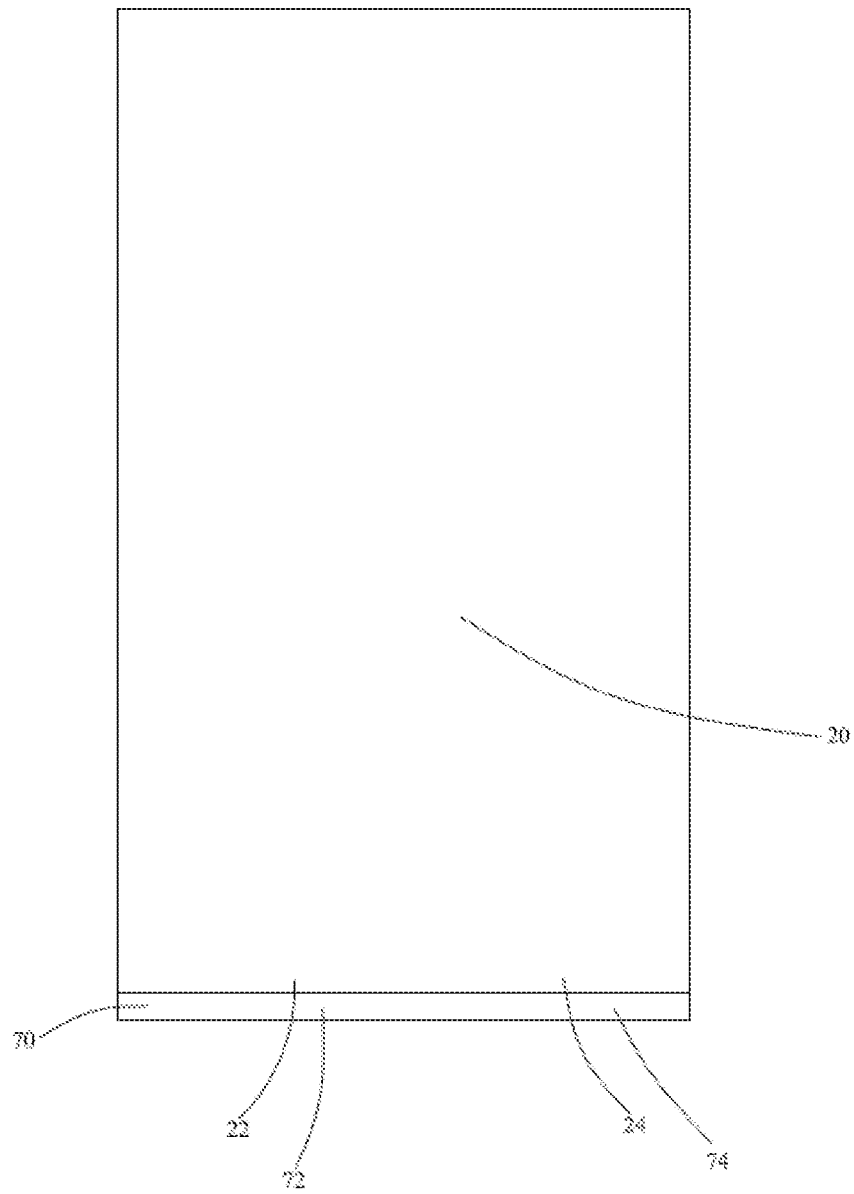
FIG. 3 is a schematic diagram of a flexible element (spreading out) of the flexible element of FIG. 1.

The flexible member 20 is made of a flexible material that is used to provide a function for a user. For example, the flexible element 20 may be a flexible touchpad providing a touch function, and a user may input text or symbols by the flexible touchpad. The flexible element 20 may also be a flexible display providing a display function, and the user may view the text or images by the flexible display. The flexible element 20 is wound around the inner casing 50, i.e., it is between the inner casing 50 and the housing 10. The flexible element 20 is partially fixed to the movable member 54 of the inner casing 50, and it can be driven by the movable member 54 to be rolled up or spread out. An end of the flexible element 20 is fixed to an outer surface of the inner casing so as to rotate with the movable member, in an embodiment, a width of the flexible element 20 is slightly less than a length of the housing 10 in order to obtain a larger usable area. At this time, a width of the end of the flexible member 20 is substantially the same as a length of the inner casing 50. With reference to FIG. 3, the flexible member 20 is shown in a spread-out state. The end of the flexible element 20 includes a first portion 22 and a second portion 24 connected to the first portion 22. The fixed member 52 is surrounded by the first portion 22, and the movable member 54 is surrounded by the second portion 24. The second portion 24 is fixed to the outer surface of the movable member 54. The first portion 22 is separated from the fixed member 52 to avoid affecting the rotation of the flexible element 20. In other words, the second portion 24 of the flexible element 20 corresponding to the movable member 54 is fixed to the movable member 54, and the first portion 22 corresponding to the fixed member 52 is separated from the fixed member 52. Moreover, since the flexible element 20 is flexible and the first portion 22 is wound due to a linked connection to the second portion 24 instead of a direct driving force provided by a supporting mechanism, the flexible element may have wrinkles during the winding process. In order to avoid wrinkles, the end of the flexible element 20 may be provided with a rigid support member 70. The length of the support member 70 is the same as the width of the flexible element 20. The support member 70 may be connected to the end of the flexible element 20 by means of a snap, a screw or an adhesive. The support member 70 is an article with an elongated rigid structure, such as an iron bar, a steel ruler and the like. The support member 70 includes a fixed part 74 and a connecting part 72. The fixed pail 74 corresponds to the second portion 24 of the flexible element 20 and they are fixedly connected. The connecting part 72 corresponds to the first portion 22 of the flexible element 20 and they are fixedly connected. The fixed part 74 is fixed to the outer surface of the movable member 54 by means of a snap, a screw or an adhesive, and the connecting part 72 is separated from the fixed member 52. Therefore, when the flexible element 20 is wound, the fixed part 74 of the support member 70 will drive the first portion 22, the connecting part 72 and the second portion 24 to rotate together, and the connecting part 72 is separated from the fixed member 52 to ensure that rotation will not be blocked by the fixed member 52. In addition, since the support member 70 is rigid, the first portion 22 can be effectively supported by the support member during rotation without wrinkles.

It can be understood that, the term "separate" as used herein means that there is no fixed connection between two elements, but it does not mean that the two elements must be apart from each other. In other words, the two elements can be in contact with each other, as long as they are not fixed, the two elements can be defined as "separated".

Figure 4:
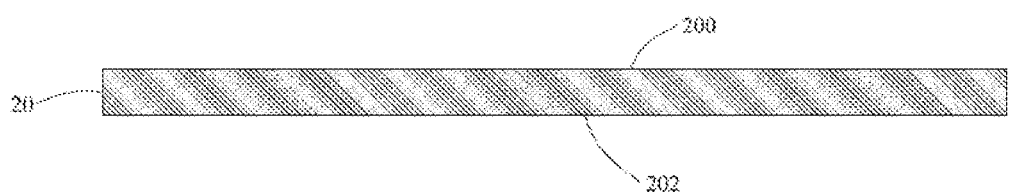
FIG. 4 is a sectional view of a flexible element (spreading out) of the flexible element of FIG. 1.

Further, with reference to FIG. 4, a surface of the flexible element 20 providing a certain function is defined as a functional surface 200. For example, a functional surface 200 of a flexible touchpad is a touch surface, and a functional surface 200 of a flexible display is a display surface. A surface of the flexible element 20 which is opposite to the functional surface 200, is defined as a support surface 202. In an embodiment, when the flexible element 20 is spread out, the functional surface 200 of the flexible element 20 is an upper surface, and the support surface 202 is a lower surface. When the flexible element 20 is wound, the functional surface 200 is bent and faced to the outer surface of the inner casing 50.

Figure 5:
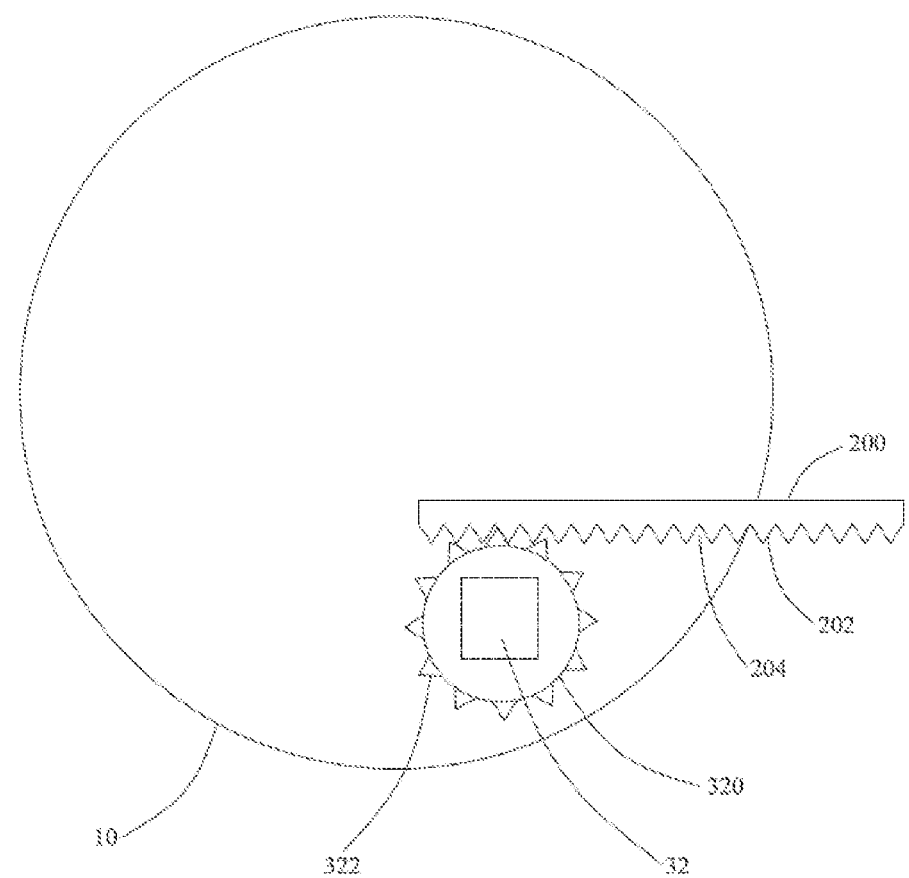
FIG. 5 is an operation schematic diagram of a flexible device according to another embodiment of the present disclosure.

With reference to FIG. 5, a plurality of first positioning portions 204 extending in a width direction of the flexible element 20 may be formed on the support surface 202. The first positioning portions 204 are positioning grooves that are aligned in a length direction of the support surface 202 and are parallel to each other. The driving element 30 may also include a further motor 32 disposed in the electronic device cavity 564 and fixed to the bottom of the housing 10. The further motor 32 includes a wheel 320. A plurality of second positioning portions 322 is formed on periphery of the wheel 320. The shape of the second positioning portion 322 corresponds to the shape of positioning groove, such that each second positioning portion 322 can be engaged with each positioning groove. When the further motor 32 is working, the wheel 320 may be driven to rotate. During the rotation of the wheel 320, one of the second positioning portions 322 is engaged with one of the positioning grooves in turn, so as to drive the flexible element 20 to move to be rolled up or spread out. In an embodiment, the further motor 32 is not limited to be fixed to the bottom of the housing 10, it may be fixed to a side wall of the inner surface of the housing 10 and a same driving effect may be achieved. Compared to the case that the flexible element 20 is driven by the motor drive in a pulling manner, the flexible element is driven by the further motor 32 in a snapping connection manner with the same effect, and thus a driving process is more reliable and a spreading process of the flexible element 20 may be realized effectively. In another embodiment, the driving element 30 may also include a further motor 32 or it only include one motor, and the two motors are not necessary to be used at the same time.

What is claimed is:

1. A flexible device, comprising:
   a housing,
   a flexible element, and
   a driving element accommodated in the housing, wherein the driving element is configured to drive the flexible element to be accommodated in the housing;
   wherein the housing defines a first cavity and a second cavity, the first cavity and the second cavity are separated from each other, and each of the first cavity and the second cavity is provided with a speaker.

2. The flexible device according to claim 1, wherein the first cavity is opened to a first end of the housing and the second cavity is opened to a second end of the housing opposite to the first end, and sound production directions of two speakers are from the ends of the flexible device to outside and opposite to each other.

3. The flexible device according to claim 1, wherein the driving element is located between the first cavity and the second cavity.

4. The flexible device according to claim 1, wherein the first cavity and the second cavity are separated by at least one partition.

5. The flexible device according to claim 4, wherein the at least one partition comprises a plurality of partitions arranged in the housing and an electronic device cavity is formed between two adjacent partitions for accommodating the driving element.

6. The flexible device according to claim 5, further comprising a controller and a battery disposed in the electronic device cavity.

7. The flexible device according to claim 5, wherein the electronic device cavity is defined in the middle of the housing and between the first cavity and the second cavity, a volume of the electronic device cavity is smaller than that of any one of the first cavity and the second cavity.

8. A flexible device, comprising:
   a housing,
   a flexible element,
   a driving element accommodated in the housing, the driving element configured to drive the flexible element to be accommodated in the housing; and
   an inner casing accommodated in the housing, wherein the flexible device is wound around the inner casing when accommodated in the housing.

9. The flexible device according to claim 8, wherein the driving element is accommodated in the inner casing.

10. The flexible device according to claim 8, wherein the inner casing comprises a fixed member and a movable member that is movable relative to the fixed member.

11. The flexible device according to claim 10, wherein the fixed member is fixed to the housing and an end of the movable member is movably connected with an end of the fixed member.

12. The flexible device according to claim 10, wherein the first cavity is defined in the fixed member and the second cavity is defined in the movable member.

13. The flexible device according to claim 10, wherein the driving element is fixed to the fixed member and operated to drive the movable member to rotate.

14. The flexible device according to claim 10, wherein an end of the flexible element comprises a first portion and a second portion connected to each other, the first portion corresponds to the fixed member but is separated from the fixed member and the second portion corresponds to the movable member and is fixed to movable member.

15. The flexible device according to claim 14, wherein a rigid support member is provided at an end of the flexible element, and comprises a fixed part fixedly connected to the second portion and a connecting part fixedly connected to the first portion.

16. The flexible device according to claim 15, wherein the fixed part of the support member is fixed on the movable member, and the connecting part of the support member is separated from the fixed member.

17. The flexible device according to claim 8, wherein the flexible element comprises a functional surface and a support surface opposite to the functional surface, and the functional surface is bent to and faced to the inner casing when the flexible element is accommodated in the housing.

18. The flexible device according to claim 17, wherein a plurality of first positioning portions is formed on the support surface, the driving element comprises a rotating wheel provided with a plurality of second positioning portions, in which the driving element is operated to drive the rotating wheel to rotate, such that the second positioning portions are engaged with the respective first positioning portions sequentially, so as to drive the flexible device to move.

19. A flexible device, comprising:
  a housing;
  a flexible element; and
  a driving element accommodated in the housing, the driving element configured to drive the flexible element to be accommodated in the housing;
  wherein the housing defines a first cavity and a second cavity and the driving element is located between the first cavity and the second cavity.

20. The flexible device according to claim 19, wherein the first cavity and the second cavity are separated by a plurality of partitions;
  wherein the partitions are arranged in the housing and an electronic device cavity is formed between two adjacent partitions for accommodating the driving element.

* * * * *